US012781989B2

(12) United States Patent
Peterson et al.

(10) Patent No.: US 12,781,989 B2
(45) Date of Patent: Nov. 3, 2026

(54) INDIVIDUAL BUILDING SPACE DIFFERENTIAL PRESSURE MEASUREMENT FOR VENTILATION AND AIR QUALITY CONTROL

(71) Applicant: XCSpec, Inc., Corte Madera, CA (US)

(72) Inventors: Janet Lynn Peterson, Larkspur, CA (US); Peter Olof Peterson, Larkspur, CA (US)

(73) Assignee: XCSpec, Inc., Corte Madera, CA (US)

( * ) Notice: Subject to any disclaimer, the term of this patent is extended or adjusted under 35 U.S.C. 154(b) by 327 days.

(21) Appl. No.: 18/375,924

(22) Filed: Oct. 2, 2023

(65) Prior Publication Data

US 2024/0210068 A1 Jun. 27, 2024

Related U.S. Application Data

(60) Provisional application No. 63/412,484, filed on Oct. 2, 2022.

(51) Int. Cl.
*F24F 11/72* (2018.01)
*F24F 11/63* (2018.01)
(Continued)

(52) U.S. Cl.
CPC .............. *F24F 11/72* (2018.01); *F24F 11/63* (2018.01); *G05B 15/02* (2013.01);
(Continued)

(58) Field of Classification Search
CPC .. F24F 11/00; F24F 11/30; F24F 11/70; F24F 11/72; F24F 11/62; F24F 11/63;
(Continued)

(56) References Cited

U.S. PATENT DOCUMENTS 5,394,934 A * 3/1995 Rein ........................ F24F 11/30 165/200
6,514,138 B2 * 2/2003 Estepp .................. F24F 11/745 454/236
(Continued)

OTHER PUBLICATIONS

Ashrae Position Document on Indoor Carbon Dioxide. Feb. 2, 2022. Ashrae. URL: https://www.ashrae.org/file%20library/about/position%20documents/pd_indoorcarbondioxide_2022.pdf.

*Primary Examiner* — Ronald D Hartman, Jr.
(74) *Attorney, Agent, or Firm* — Conley Rose, P.C.

(57) ABSTRACT

An automated communicating system continuously derives differential pressure relative to a reference and provides a user display of this value. The system may include, among other elements, a remote transmitter, multiple receiving devices, a visual display, pre and post processing algorithms, a user interface to input a pressure set point, and a one or more air quality sensors. A differential pressure is derived from two absolute pressure readings, resulting in a determination of space over- or under-pressurization relative to a set point. Post-processing algorithms and filters are applied to the final output data stream prior to visual display of the space over- or under-pressure conditions. Calibration may be based on a zeroization method to determine an offset value used by the pressure algorithm to address differences between absolute pressure sensors production offsets, drift, and altitude differences between the physical placement of the two absolute sensors. A visual display depicts air quality through display of airborne molecule levels and space pressurization to provide ventilation and an air flow at-a-glance gauge.

20 Claims, 12 Drawing Sheets

(51) Int. Cl.

| | |
|---|---|
| ***F24F 110/20*** | (2018.01) |
| ***F24F 110/40*** | (2018.01) |
| ***F24F 110/64*** | (2018.01) |
| ***F24F 110/66*** | (2018.01) |
| ***F24F 110/70*** | (2018.01) |
| ***F24F 120/10*** | (2018.01) |
| ***G05B 13/02*** | (2006.01) |
| ***G05B 15/02*** | (2006.01) |
| ***G05B 19/042*** | (2006.01) |

(52) U.S. Cl.
CPC ....... *F24F 2110/20* (2018.01); *F24F 2110/40* (2018.01); *F24F 2110/64* (2018.01); *F24F 2110/66* (2018.01); *F24F 2110/70* (2018.01); *F24F 2120/10* (2018.01); *G05B 13/02* (2013.01); *G05B 19/042* (2013.01)

(58) Field of Classification Search
CPC .. F24F 7/06; F24F 11/46; G05B 15/02; G05B 19/042; G05B 13/02
USPC .......................................................... 700/276
See application file for complete search history.

(56) References Cited

U.S. PATENT DOCUMENTS

| | | | | |
|---|---|---|---|---|
| 8,918,218 | B2 * | 12/2014 | Grabinger | G05B 19/0428 454/239 |
| 2003/0064676 | A1 * | 4/2003 | Federspiel | B61D 27/00 454/75 |
| 2003/0157882 | A1 * | 8/2003 | Boulanger | F24F 7/06 454/256 |
| 2008/0076346 | A1 * | 3/2008 | Ahmed | F24F 11/30 454/256 |
| 2008/0139105 | A1 * | 6/2008 | Kuentz | F24F 11/77 454/238 |
| 2015/0168956 | A1 * | 6/2015 | Guan | G01F 25/10 137/115.03 |
| 2016/0054024 | A1 * | 2/2016 | McKie | F24F 12/001 454/238 |
| 2016/0169545 | A1 * | 6/2016 | Mangsuli | G05B 13/0205 700/276 |
| 2017/0268956 | A1 * | 9/2017 | Laine | F24F 11/77 |
| 2018/0139517 | A1 * | 5/2018 | Schwartz | F24F 11/56 |
| 2019/0093911 | A1 * | 3/2019 | Helt | F24F 11/0001 |
| 2019/0331358 | A1 * | 10/2019 | Ritmanich | F24F 11/46 |
| 2021/0011644 | A1 * | 1/2021 | Ippatapu | G06F 3/0608 |
| 2021/0341168 | A1 * | 11/2021 | Okeya | F24F 7/08 |

* cited by examiner

INDIVIDUAL BUILDING SPACE DIFFERENTIAL PRESSURE MEASUREMENT FOR VENTILATION AND AIR QUALITY CONTROL

CROSS-REFERENCE TO RELATED APPLICATION

This application claims the benefit of U.S. Provisional Application No. 63/412,484, filed Oct. 2, 2022, and titled "INDIVIDUAL BUILDING SPACE DIFFERENTIAL PRESSURE MEASUREMENT FOR VENTILATION AND AIR QUALITY CONTROL," which is herein incorporated by reference in its entirety.

BACKGROUND

Air handling in buildings is linked to the health of the occupants breathing the air. Understanding air pressure within a building should be basic to the management of the building air handling systems. Over- or under-pressurization in buildings, large or small, can result in a number of problems. For example, under-pressurization can cause problems trying to open the door from the outside. Over-pressurization may create a wind tunnel effect in elevator or stairwell areas, potentially creating a significant fire hazard. Over-pressurization has also been singled out for causing outside building facias or windows to become detached or cracked. Determining building space pressure can be particularly difficult for buildings over 300 feet tall due to "Stack Effect". Stack effect is a result of pressure differences between the outside environment and inside conditions in tall buildings. Stack effect is troublesome for occupants as it may cause doors to fail to open and prevent elevator doors from closing. Notwithstanding these concerns, the pandemic has encouraged over-ventilating buildings to increase air movement within the buildings.

SUMMARY

Building ventilation can be measured and balanced by HVAC technicians or systems. For example, ventilation in a building can be measured in terms of volume or speed of air flow (e.g., in $ft^3/m$), and space pressures measured at ducts, doors, etc. per building code requirements. In some larger buildings, this information can be used to set the control of Variable Air Volumes (VAVs) controlled by a building management system (BMS). VAVs measure the rate that the air is being delivered into the space, rather than the pressure in the space the VAVs are serving. However, ventilation within a building is very dynamic, changing in response to factors such as doors or windows being opened, furniture moved to cover air ducts, or tenant improvements that change the ducting scheme, to name a few examples. Knowledge of the actual space pressures relative to outside air pressure allows a building management system to adjust the rate of input and exhaust air to maintain known pressures within the space. Maintaining known positive pressures assures that the air is flowing through the ventilation, resulting in healthy air via the introduction of new outside air, system air filtering and exhausting of stale used air.

To measure differential pressure between the inside building and outside air pressure the industry standard employs the use of tubed pressure sensors. Currently in big buildings, systems are set up to a specific flow rate, so that, for example, when a storm goes through and outside pressure drops quickly, the building is over pressurized and problems such as those mentioned above result.

While this may provide the information necessary to determine space pressures, running tubes between the roof top of a 90 story building and $50^{th}$ floor is not a scalable solution to deploy in large numbers. In some cases, these sensors should receive annual manual calibration, adding additional maintenance costs. Finally, real time indicators about the spaces pressures in a particular building's room may not be available to the occupant, leaving an unknown in terms of health and air quality of the occupied space.

A tubeless and wireless self-calibrating system described herein may be automated to accurately measure differential pressures in a space relative to the outside air pressure. Because it measures in real time, controls in real time, measures space pressure relative to the outside pressure, the described system can dynamically adjust for changing weather pressures as opposed to systems that are set up for fixed air flow ventilation into the space. Furthermore, particularly in wireless implementations, the described system is both scalable and cost-effective.

The derived differential pressures can then be communicated to air handling equipment or a building automation system to manage building exhaust and air supply systems based on information from an individual space location in the building. In some embodiments, this differential pressure measurement system may include an easy-to-see display that depicts on-going air movement (positive or negative) and CO2 levels within the space. Understanding the number of molecules in a room combined with room pressurization can provide an "at-a-glance" understanding of the health of the air in that occupied space.

DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
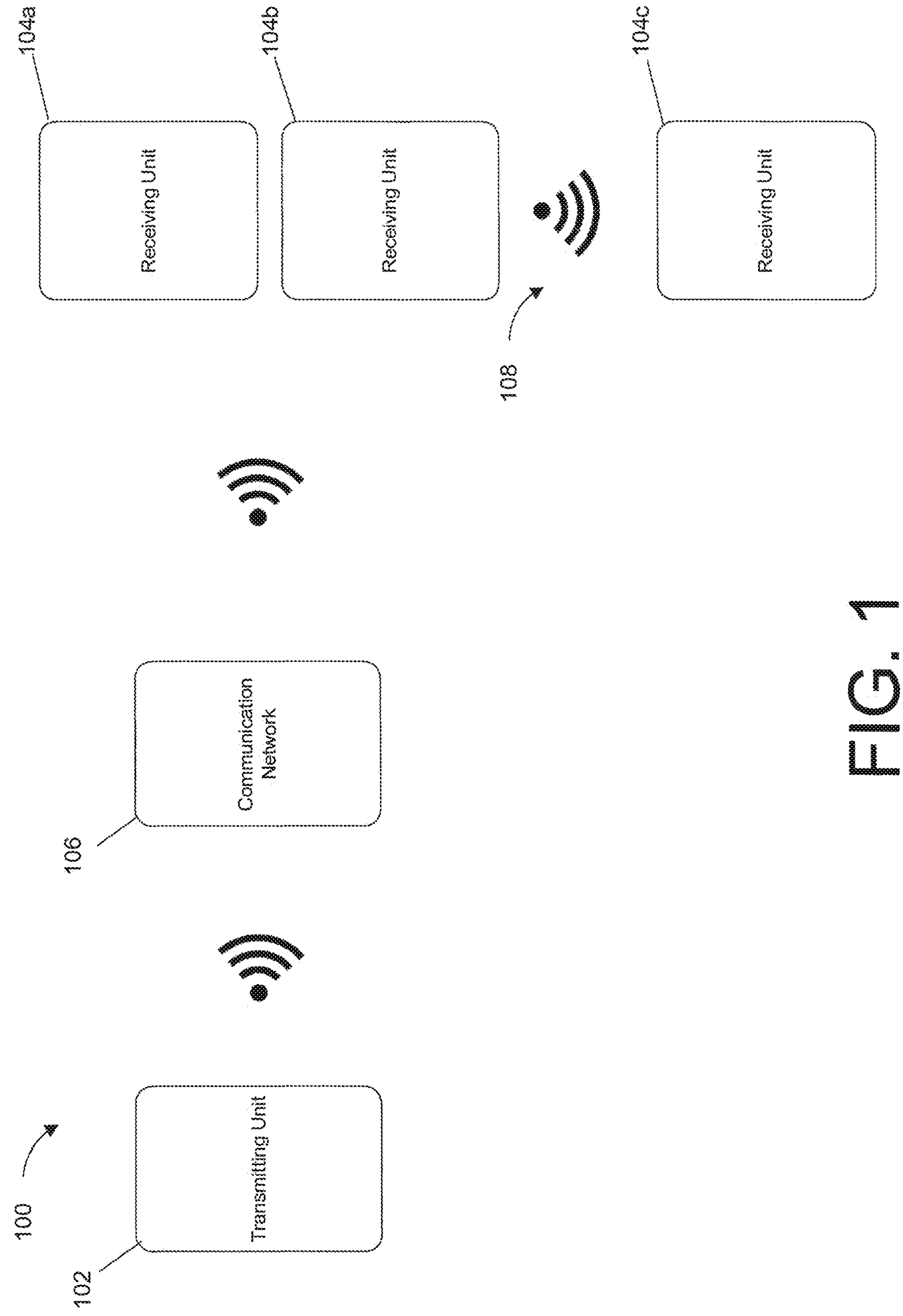
FIG. 1 shows an example of a communications system between an outside air transmitting unit and multiple ventilation control receiving units.

The present disclosure describes an automated ventilation control system that can continuously derive a differential pressure between two absolute pressure sensors. This resultant pressure can be used by the ventilation system to control various elements in the HVAC system. Additionally, this data can be displayed for occupants or others to see the ventilation quality of their living space. The system can derive and depict the pressure differential relative to a single point—the pressure of outdoor air for example, or of a designated indoor space or other space. The system may include, among other elements, one or more of a transmitting unit with measurement and communication components; and one or more ventilation control receiving units with measurement and communications components, a visual display component, pre- and post-processing algorithms, a user interface component (that may be incorporated in the visual display component) to input a pressure set point, and a CO2 sensor and/or other air quality measurement sensors, such as for detecting and/or measuring volatile organic compounds (VOCs) or particulates (e.g., PM2.5), to provide input to one or more of the algorithms.

In at least some embodiments utilizing one ventilation control receiving unit ("receiving unit") to monitor a space, the receiving unit is configured to receive absolute pressure values from the remote transmitter. A differential pressure value is derived from the absolute pressure sensed by the receiving unit and the absolute pressure received from the transmitting unit, from which an over- or under-pressurization of the space monitored by the receiving unit can be determined relative to a set point. The BMS or ventilation control system, including a thermostat for example, may determine the over-/under-pressurization or the set point, or both. Post-processing algorithms and filters can be applied to the final output data stream prior to use of this data by the control system or display to a user.

Multiple receiving units 104 may be utilized at different sites (for example in different rooms in a building (on the same floor or different floors) or different sites in a large space (such as a stadium or concert hall). The multiple receiving units 104 and transmitting unit 102 are capable of being "dual-homed" onto two networks, allowing them to receive and transmit data on two different networks simultaneously. Multiple receiving units 104 can be configured to listen for broadcast data from one transmitting unit 102. Similarly. one or more of the multiple receiving units 104 can be configured to listen for re-transmissions from one receiving unit 104. One of the networks may be provided by the transmitting unit 102 or receiving unit(s) 104 acting as a micro access point. Another network can be provided by an infrastructure access point or other radio hub—LORA, Ethernet, BACNET, ModBus, ZIGBEE, 904 MHZ, etc., for example.

In systems utilizing multiple receiving units in different respective spaces, each of the receiving units may include the same or similar components, including but not limited to those components that determine absolute pressures in its own space.

The receiving unit may be calibrated to determine an offset value that compensates for variations in the determination of differential pressure. Methods for calibration may be based on a zeroization method, incorporating a signal received from a building's HVAC or BMS system that indicates the start and stop of a calibration cycle, and/or outlining a calibration cycle that is triggered based on a determination that the space is in an UNOCCUPIED state (through the use of a CO2 sensor, or the thermostat schedule). In some example embodiments, the offset value may be used by one or more of the algorithms described herein to address such variations as manufacturing or sensitivity differences in the respective absolute pressure sensors, drift introduced over time, and altitude differences among the physical placement of the various pressure sensors. Moreover, the temperature of the transmitter and/or receiver sensor membranes may be controlled, for example through a modulating pulse width signal with feedback driving a heating element at the sensor. In some embodiments, a visual display that depicts air quality through display of the air borne CO2 levels and/or space pressurization can provide the likes of ventilation, air flow metrics, etc. at-a-glance. Per the Environmental Protection Agency, Air Quality is an index for reporting how clean or polluted the air is, and what associated health effects might be of concern. By this definition, Air Quality focuses on health effects experienced within a few hours or days of breathing unhealthy air. It is to be noted that the concepts, embodiments, and implementations described and claimed herein are not necessarily limited by interpretations by the EPA or any other specific entity.

In some embodiments, the transmitting unit may be provided and configured to communicate wirelessly with the receiving unit. Among other information, the transmitting unit may continuously measure and transmit local pressure (e.g., the absolute air pressure measured at the location of the transmitter or pressure sensor associated with, or in communication with, the transmitter) to all receiving units within a radio signal distance. A receiving unit can retransmit the transmitting unit information, e.g., via broadcast or directed to a specific receiving unit or units. Receiving units that may be unable to reliably receive the radio signal directly from the transmitting unit can be configured to listen to another receiving unit to obtain the relevant transmitting unit data retransmitted by the receiving unit.

The term "wireless transmission" is not intended to be limiting, but may encompass, for example, other suitable signal transmission methods including but not limited to Wi-Fi, Lo-Ra, Power over Ethernet (POE), Ethernet, BacNet, Modbus, Cellular, BlueTooth, RF in any ISM unlicensed band, Zigbee, cable, I2C bus, serial and/or directly to an application programming interface for cloud-based calculations.

The transmitting unit can be battery and/or line voltage operated, for example, and can support a visual method to test the communication link to the receiving unit(s) and confirm operation. Some tests can be controlled through an embedded web server running on the transmitting unit that is accessible through a browser, allowing control of the test to be remote from the transmitting unit, such as via a smartphone, tablet, laptop, or other computing device. Incorporating the testing capability directly in the transmitting unit, therefore, is a non-limiting example, and testing components (in addition to testing control components) may be provided apart from the transmitting unit. The transmitting unit may also contain components to audibly notify the user of conditions such as low battery or other alert conditions, for example, in the case that the unit is battery operated.

The receiving unit can also be battery and/or line voltage operated. Furthermore, in some embodiments, a visual method for an installer to configure the system from the receiving unit or remotely may be provided. The visual method may include an installer's guide, configuration settings, and/or the like. Visual elements can be provided through an embedded web server that is accessible through a standard browser, allowing the configuration to be guided remotely from the receiving unit, such as via a smartphone, tablet, laptop, or other computing device. Likewise, in some embodiments, the configuration capability may be incorporated in the receiving unit.

In one example of the visual display, the receiving unit can display a derived differential value output for continuous, periodic, aperiodic, or on-demand space pressure observation. In one or more embodiments, a control signal from the receiving unit may be used to control ventilation dampers, VAVs, air handling units, or other input or output dampers in the building used to control the introduction of new air or the exhaust of stale used air. Data from individual receiving units may also be integrated with the building's BMS system, either wirelessly or wired.

Advantages of the examples described herein are numerous and borne out in providing differential pressure measurements between two or more independent points at a low cost and minimal installation effort, offering a scalable solution for large buildings. The examples may use separate micro-electromechanical system (MEMS)-sourced absolute pressure sensor data to perform the algorithms associated with determining the pressure difference between the areas of interest. A visual indicator of individual space pressure/ventilation characteristics can show air molecules present and the flow of these air molecules into or out of a space based on positive or negative pressurization. Updating the firmware on the invention over a wireless link to provide future capabilities and bug fixes is also possible.

FIG. 1 shows an example of a communications system 100 between an outside air transmitting unit 102 and multiple ventilation control receiving units 104. The outside air is typically used by all indoor receiving units to derive differential pressure in the space the receiving units are installed in. In at least some embodiments, at least one of the receiving units 104 is configured to receive data from the transmitting unit 102 over a communication network 106, decode the protocol, and send translation commands to a ventilation control system (not shown). One or more of the receiving units 104 may also be configured for the re-transmission of some or all of the information received from the transmitting unit 102 and used by various algorithms that use data of pressure and other conditions sensed at the measurement sites within the respective space monitored by the receiving unit(s). These re-transmissions can be used by the receiving units 104 to obtain pressure baseline conditions, or reference conditions, associated with the transmitting unit 102 when not within radio range of the transmitting unit.

The transmitting unit 102 may receive measurements from one or more sensors integrated into the transmitting unit and/or made by a local sensor or sensors associated with the transmitting unit 102 (e.g., at a site local to the transmitting unit and in communication with the transmitting unit), including but not limited to pressure, temperature, and/or humidity, and may wirelessly transmit the data to one or more of the receiving units 104. Any sensor not integrated into the transmitting unit 102 but used for baseline measurement should be either representative of the site at which the transmitting unit is located or used as the reference source for its own site. The transmitting unit 102 may have an internal or external antenna, and may be battery or line powered.

One or more of the receiving units 104 may be a standalone unit and/or be incorporated into an HVAC system, such as in a thermostat that supports one or more of the same or similar functions as those performed by the receiving units 104. For example, a receiving unit 104 may be incorporated in a standard HVAC thermostat. The receiving unit 104 may have an internal antenna or an external antenna, and may be battery or line powered.

The receiving unit 104 may be configured with hardware and/or software to capture transmissions from the transmitting unit 102 and align remote sensor readings received from the transmitting unit 102 with local readings stored at each receiving unit 102, for example by time-syncing the remote and local readings. A user display can also be provided to indicate measurements and related analysis, including without limitation real-time space pressure and CO2 molecule parts per million levels at the sensor site, which could be the location of the transmitting unit 104 or the receiving unit 102, or the location of a sensor remote from but in communication with either of these, for example. The user display may also display differential pressure, e.g., the difference between absolute pressures measured at the transmitting unit and receiving unit.

Data transmitted by the transmitting unit 104 may be communicated through a UDP packet and, depending on configuration, retransmitted from a receiving unit 104 to another receiving unit or units. In some embodiments, for example, the receiving unit 104*c* may be configured to communicate with a micro access point provided by the receiving unit 104*b*, which receives the data transmission directly from the transmitting unit 102. This allows the receiving unit 104*c* to listen for retransmission packets specifically from the receiving unit 104*b* over, e.g., a wireless link 108, and obtain the data being transmitted substantially at the same time as received by the receiving unit 104*b*. This transmission hopping can continue to other receiving units 104 that are not illustrated in FIG. 1, from the receiving unit 104*b* or from another receiving unit 104 acting as a micro access point as described above.

Figure 2:
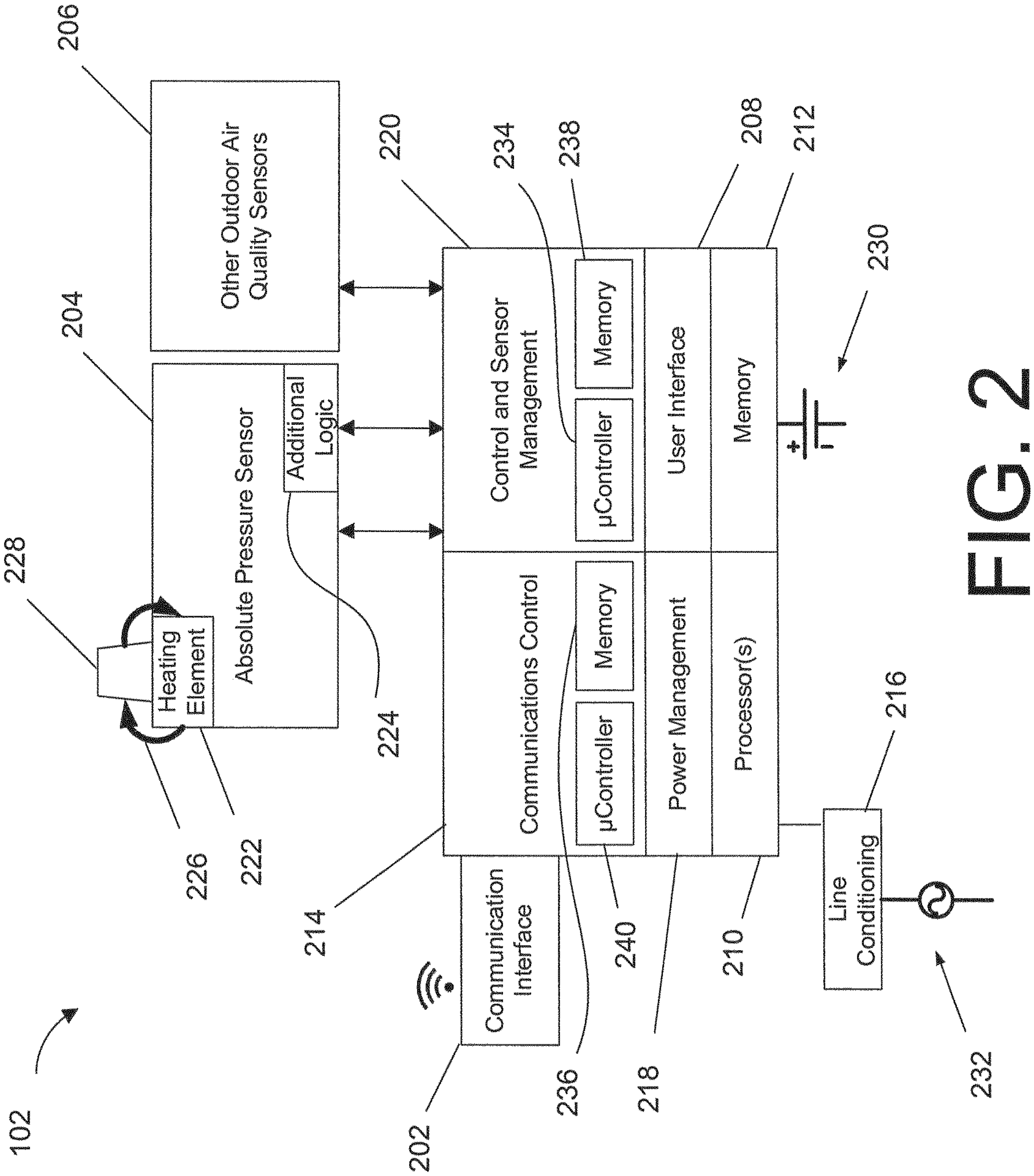
FIG. 2 shows components of an example transmitting unit in block diagram form according to at least one embodiment.

FIG. 2 shows components of an example transmitting unit 102 in block diagram form according to at least one embodiment. This figure identifies the breakout of hardware logic elements that can perform various functions of the transmitting unit 102.

In some embodiments, the transmitting unit 102 may include a communication interface 202, an absolute pressure sensor 204, other outdoor air quality sensors 206, a user interface 208, one or more processors 210, and memory 212. The transmitting unit 102 may further include other device hardware such as a modem, signal converters, antennas, hardware decoders and encoders, graphic processors, a Universal Integrated Circuit Card (UICC) slot (e.g., SIM slot) to receive a UICC, and/or the like that enables the transmitting unit 102 to execute applications and provide telecommunication and data communication functions.

The communication interface 202 may be a network interface card supporting Ethernet and/or Wi-Fi and/or any number of other physical and/or datalink protocols that enable the transmitting unit 102 to transmit or receive voice or data communication via the communication network 106, as well as other telecommunication and/or data communication networks. Where the communication network 106 is a cellular network, the communication interface 202 will include a cellular radio and radio access software layer.

The absolute pressure sensor 204 includes a heating element 222 for temperature control of the sensors membrane, and additional logic 224 employed to equalize pressure readings between two physically separated devices. The additional logic 224 may include one or more software filters that can be applied to the output from the absolute pressure sensor 204 for out of band readings, rate of change dampening, and sample timing to improve data integrity and reliability.

The other outdoor air quality sensors 206 may include, but are not limited to, one or more sensors of: temperature, humidity, particulates. Fine particulates of 2.5 um or less in diameter have an increased adverse health effect because they penetrate more deeply into the respiratory system. Unlike airborne dust that settles out of the air quickly, smaller particulates stay suspended in the air for longer time periods. Airborne fire smoke particulates are particulates in the 35 ug/$m^3$ size that the EPA has categorized as unhealthy for sensitive groups. Data obtained via these sensors can be used to expand the HVAC ventilation control and visual display of air quality, etc. as described elsewhere herein.

The user interface 208 may enable a user to provide input and receive output. For example, the user interface 208 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The one or more processors 210 may comprise a central processing unit and/or a dedicated controller such as a microcontroller. The processor(s) 210 and the memory 212 may implement a platform (e.g., Android, Apple, IoT), device software, one or more applications, one or more pre-installed services, and modem software, by way of example. The various software and applications may include routines, program instructions, objects, and/or data structures that perform particular tasks or implement particular abstract data types.

The memory 212 may be implemented using computer-readable media, such as computer storage media. Computer-readable media include, at least, two types of computer-readable media, namely computer storage media and communications media. Computer storage media include volatile and non-volatile, removable and non-removable media implemented in any method or technology for storage of information such as computer-readable instructions, data structures, program modules, or other data. Computer storage media include, but are not limited to, RAM, ROM, EEPROM, flash memory or other memory technology, optical storage, magnetic storage, or other non-transmission medium that can be used to store information for access by a computing device. In contrast, communication media may embody computer-readable instructions, data structures, program modules, or other data in a modulated data signal, such as a carrier wave, or other transmission mechanism.

The operating system may include components that enable the transmitting unit 102 to receive and transmit data via various interfaces (e.g., user controls, communication interface 202, and/or memory input/output devices). The operating system may also process data using the processor(s) 210 to generate output based on input received via the user interface 208. For example, the operating system may provide an execution environment for the execution of the applications. The operating system may include a presentation component that presents the output (e.g., displays the data via the user interface 208, stores the data in memory 212, transmits the data to another electronic device, etc.).

The operating system may further include an interface layer that enables applications to interface with the modem and/or the communication interface 202. The interface layer may comprise public APIs, private APIs, or a combination of both public APIs and private APIs. Additionally, the operating system may include components that perform various other functions generally associated with an operating system.

The device software may include software components that enable the transmitting unit 102 to perform functions. For example, the device software may include a basic input/output system (BIOS), Boot ROM, or a bootloader that boots up the transmitting unit 102 and executes the operating system following power up of the device.

The applications may include applications that provide utility and/or productivity functionalities to a user of the transmitting unit 102. For example, the applications may include telephony applications, electronic mail applications, remote desktop applications, web browser applications, navigation applications, multimedia streaming applications, and/or so forth. In some embodiments, the applications may include one or more pre-loaded applications and one or more consumer applications, which may be pre-loaded or later installed.

The one or more pre-installed services may include, without limitation, SMS service software and an HTTP service client. The SMS service software may provide the receiving unit with the ability to send and receive SMS messages from a Short Message Service Center (SMSC), such as an SMS server that resides on the communication network 106. The HTTP service client may enable the transmitting unit 102 to establish a communication session with a server, such as a web server or a file service, using HTTP.

The platform, applications, and pre-installed services may be comprised of software components. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The modem may include modem software that drives the modem to perform telecommunication and data communication with the communication network 106. The modem software may be firmware that is stored in dedicated non-volatile memory of the transmitting unit 102. Such non-volatile memory may include read-only memory (ROM), erasable programmable read-only memory (EPROM), or flash memory.

In addition to the components mentioned above, the transmitting unit 102 may include a communications control unit 214, a line conditioning unit 216, a power management unit 218, and a control and sensor management unit 220.

In some embodiments, the communications control unit 214 may include a memory 236 and a microcontroller 240, configured to provide secure and reliable communications between the transmitting unit 102 and one or more of the receiving units 104. Protocols for this communications link may include, without limitation, radio, Wi-Fi, Bluetooth, infrared, Ethernet, BacNet, Internet and acoustic. Communications protocols specific to the wireless medium may be executed over the link for security, flow control, reliability, signal strength determination and other wireless features. An out of band processing method may be included to allow the download of firmware updates for the microcontroller 234 on the control and sensor management unit 220 and/or the microcontroller 236 on the communications control 214. This method may be carried out with the depicted hardware, additional hardware, and/or an algorithm to verify the integrity of the binary image prior to loading into the control and sensor management unit 220 operating memory 238 or the communications controller 214 operating memory 240. A real-time clock may be provided to support time out and battery operation.

The line conditioning unit 216 unit smooths out spikes associated with noise from the power source. Because of the sensitivity of the pressure sensors to noise and the accuracy required to determine differential pressure, the embodiment of the noise cancelling hardware logic is enables a +/−2 pascal accuracy achieved using these methods.

The power management unit 218 allows the units to be put into a sleep mode to support battery operations. Power is managed separately between the sensor logic and the radio logic, allowing the unit to sample and store pressure and other air quality indicators, but turning the radio on less frequently to achieve power efficiencies.

The control and sensor management unit 220 may be configured with hardware and/or software to manage the sensor temperature via the heating element 222 and improve the reliability and integrity of the data. These functions are performed, for example, through sensor interface hardware and software logic operating a pulse width modulated control loop 226 to maintain a preset temperature at the sensor element 228.

In some embodiments, the transmitting unit 102 may embed the power management module 218, which detects the unit power source—e.g., battery 230 or line 232—and adapts communications and control operations based on a corresponding predetermined power configuration. During battery operations, a real-time clock may be used to wake up the transmitting unit 102 when asleep to save power, and/or to transmit data based on fixed and known time stamps.

The additional logic 224 may include one or more software filters that can be applied to the output from the absolute pressure sensor 204 for out of band readings, rate of change dampening, and changes to sample timing to improve data integrity and reliability. In particular, several Fast Fourier Transforms are applied to the data to "lift" the data out of the noise floor of the sensor. Averaging filters are applied to the pressure data output to address any out of band readings. Adapting the sample rate of the output is used to improve data points and increase precision of the resulted differential pressure reading.

Figure 3:
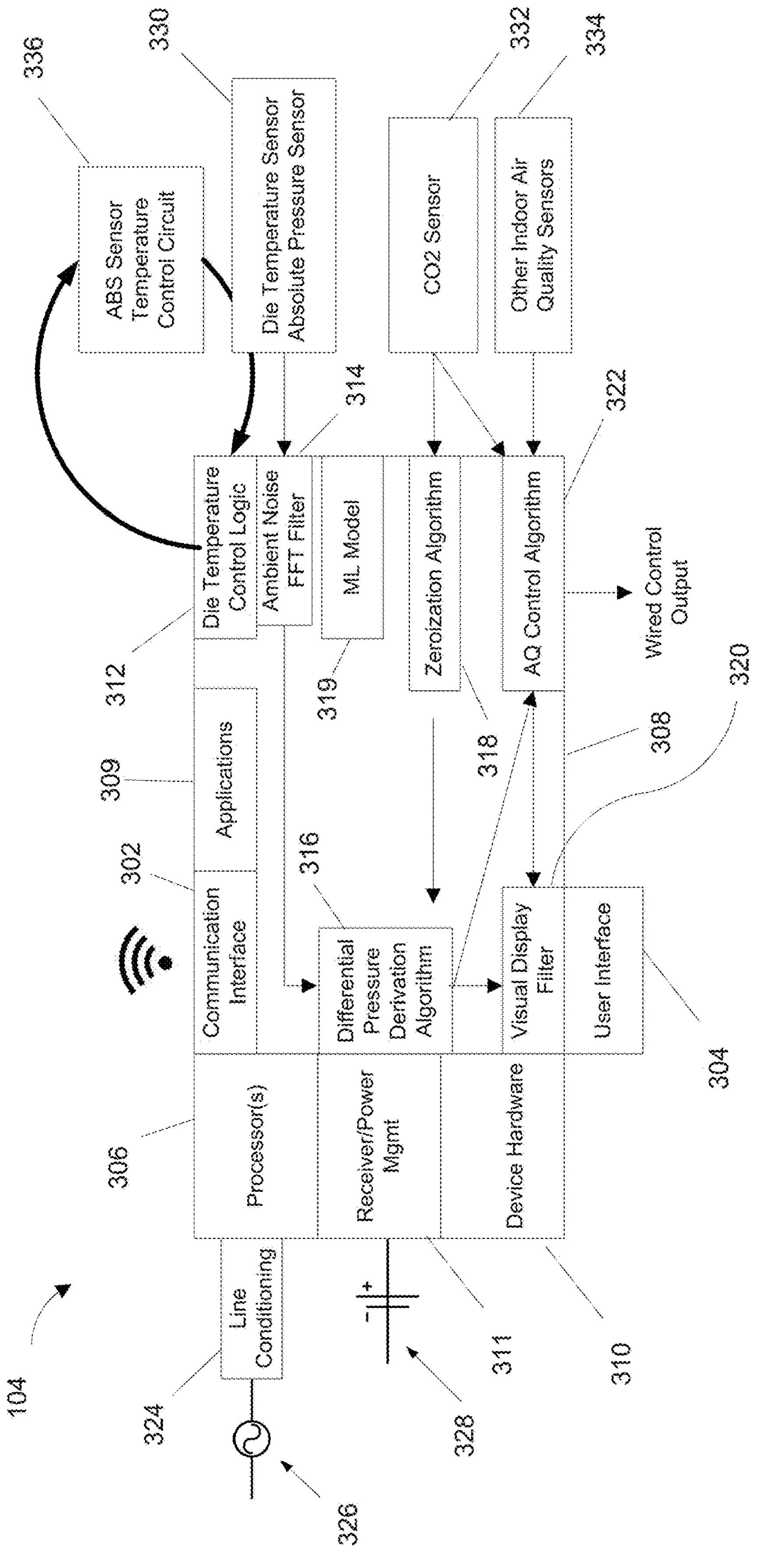
FIG. 3 illustrates an example of a ventilation control receiving unit according to at least one embodiment.

FIG. 3 illustrates an example of a ventilation control receiving unit 104 according to at least one embodiment. The receiving unit 104 may correspond to one or more of the receiving units 104 of FIG. 1. Because the receiving unit 104 includes many of the same components as are included in the transmitting unit 102 and are discussed above (such as the communication interface 302, user interface 304, processor(s) 306, memory 308, and device hardware 310), such overlapping components will not be described further except to the extent there may be non-negligible differences.

In addition to these components, the receiving unit 104 may include a power management unit 311, die temperature control logic 312, an ambient noise (fast Fourier transform) filter 314, a differential pressure derivation algorithm unit 316, a zeroization algorithm unit 318, a visual display filter 320, and an air quality (AQ) control algorithm unit 322. The receiving unit 104 may be operably coupled to receive AC power from a commercial power source 326 via a line conditioning unit 324, and/or DC power from another power source, such as a battery 328. In case the power is received from an AC power source 326, the line conditioning may include an AC/DC converter, not shown.

The communication interface 302 may be configured in at least one of the receiving units 104 for the re-transmission of data received from the transmitting unit 102. These re-transmissions can be used by those receiving units 104 that are not within radio range of the transmitting unit 102 to obtain base outside air conditions, including but not limited to baseline air pressure, humidity and/or temperature.

The receiving unit 104 may further be operably coupled to one or more sensors related to air quality, examples of which may include one or more of an absolute pressure sensor 330 (which may include or be coupled with a die temperature sensor to adjust for a pressure offset proportional to the temperature of the sensor die), a CO2 sensor 332, and one or more other indoor air quality sensors 334. In some embodiments, output of the absolute pressure sensor 330 (as adjusted according to the die temperature, in some examples) is received by the receiving unit 104 via the ambient noise FFT filter 314.

The absolute pressure sensor 330 and die temperature control logic 312 may be coupled via an ABS temperature control circuit 336. The ABS temperature control circuit 336 may receive output from the absolute pressure sensor 330 and provide the same to the die temperature control logic 312 which operates to adjust the temperature of the die via a heating element to bring the temperature of the die sensor into conformity with a desired temperature programmed into the ABS temperature control sensor 336. The objective of this circuit is to maintain a predetermined die temperature between both the transmitting and receiving sensor membranes, resulting in a more accurate pressure calculation. More particularly, the control and sensor management unit is configured to manage the sensor power of the absolute pressure sensor 330, reliability and data integrity. These functions are performed through the die temperature control logic 312 on the receiving unit 104 operating a pulse width modulated control loop that maintains a known and fixed temperature at the sensor membrane. Software filters such as the Fast Fourier Transform may be applied to the output of the absolute pressure sensor 330. In particular, pressure reading samples between the two disparate sensors are aligned in time to assure that the measurements are synchronized, resulting in comparing pressure differences within the sample period. These sample adjustments may take into consideration, for example, any communications delay incurred between getting the readings from the transmitting unit to the receiving unit. Rate of change filters applied to the output "slow" down any transients effects seen in the data from rapid noise injection.

The receiving unit 104 may be further configured to receive measurement data wirelessly from the transmitting unit 102. The primary control logic executed by the processor(s) 306 may apply the differential pressure derivation algorithm 316 to the received measurement data, store the measurement data in local data storage, and compare the measurement data with its own measurements taken by the absolute pressure sensor 330, the CO2 sensor 332, and/or the other indoor air quality sensors 334 according to a time vector to establish a differential pressure between sensors located in the compared spaces. One or more filters may be employed for the user to apply, for example via the user interface 304, rate of change limits to the output of the pressure sensor data via the communication interface 302 and/or user interface 304, transmitting unit sensor data, and derived differential pressure value output. Optionally in accordance with a data averaging filter applied to the space pressure displayed by the visual display filter 320, a value for the differential pressure may be determined and the value may be output and/or transmitted via the user interface 304 or communication interface 302.

The other relevant indoor air quality sensors 334 may include, without limitation, one or more of temperature, humidity, particulate presence, and/or other sensors. The data that they provide may be utilized by the receiving unit 104, for example by appropriate application of the AQ control algorithm 322, to extend the presentation (e.g., visual display) and further the algorithms used for the presentation of ventilation and air quality. AQ control algorithms include control over the input or output ventilation controls to introduce more fresh air or to more rapidly exhaust stale used air from the space based on readings from multiple air quality sensors like CO2 or PM2.5.

The power management unit 311 may be embedded in the receiving unit 104, and may determine the unit power source—the AC/DC line 326 (via the line conditioning unit 324) or the battery 328, for example—and adapt communications and control operations based on the power configuration. During battery operations, a real-time clock may be used in some embodiments to wake up the receiving unit 104 when powered down to save energy, and to anticipate data packets at transmitting unit-based pre-configured time intervals.

Figure 4:
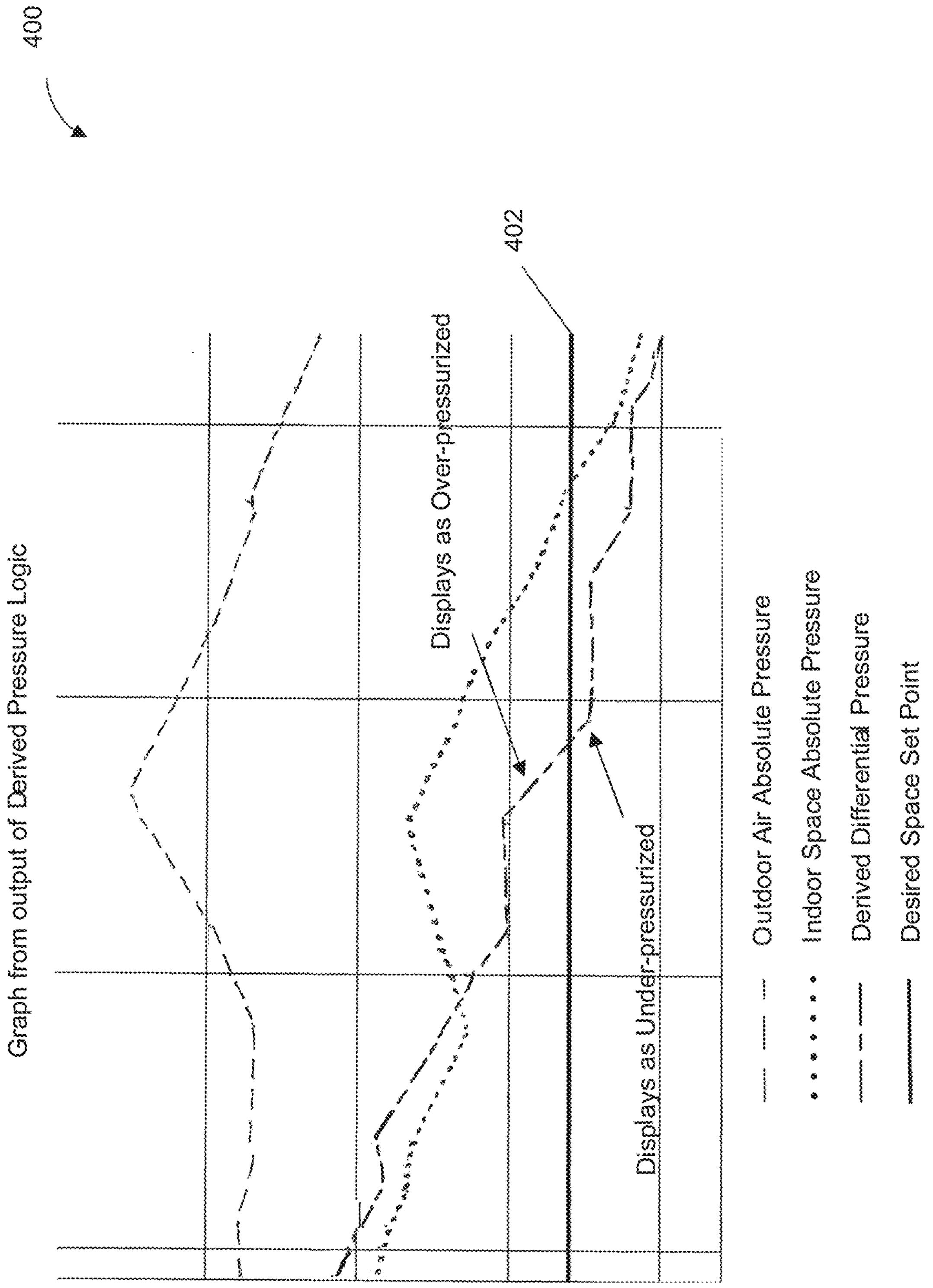
FIG. 4 illustrates the derivation of a differential pressure between pressures measured at two different spaces by respective absolute pressure sensors, such as the pressure sensors of the transmitting unit and the receiving unit, and display to a user of this value as an illustrated chart.

FIG. 4 illustrates the derivation of a differential pressure between pressures measured at two different spaces by respective absolute pressure sensors such as the pressure sensors of the transmitting unit 102 and the receiving unit 104, and display to a user of this value as an illustrated chart 400.

The receiving unit 104 may provide an easy-to-see, real-time display of space pressurization at the receiving unit 104 and at the transmitting unit 102, as well as a derived differential pressure (DDP) between them relative to a set point. In some embodiments, the DDP may be derived by subtracting the transmitting unit 102 absolute pressure from the transmitting unit 102 from the absolute pressure measured at the receiving unit 104 (or vice versa) and applying an offset term. The offset terms takes into consideration production manufacturing measurement differences associated with the actual sensors, altitude differences associated with placement of the sensors, and drift in measurements associated with the sensors' specifications.

The production offset is based on the differences in pressure measurement readings between sensors associated with the physical production of the MicroElectroMechanical sensor units. This range is specified by the sensor manufacturer. While screening units to minimize pressure measurement readings differences between sensors, the embodiment of this patent uses the zeroization method defined to determine differences in sensor measurements and adjust for them in the final differential pressure calculation by adding this to the offset term. Another offset term addressed by the calibration is associated with pressure differences due to altitude. In this example the calibration function adjusts for the differences associated with altitude differences between placement of two sensors on different floors of a building for example. The sensitivity of the sensors can detect differences in altitude down to inches in some examples. Drift is introduced over time and is associated with the sensors individually. Drift is specified by the manufacturer as a range over time. Calibrating, or calculating the offset value that results in a zero difference in pressure between the two sensors, also addresses drift that may appear in the sensors during operation. To maintain an accuracy of +/−2 pascals, the sensors may be calibrated for at least 5 minutes every 24 hours, based on current MEMs pressure technology.

The DDP, whether it is positive or negative, can then be used by the HVAC ventilation system and also visually displayed on the receiving unit 104 itself through a variety of methods including but not limited to LED, e-ink, LCD or other visual method. Additionally, or alternatively, the DDP may be provided audibly or by another form of presentation. In some examples, the DDP may be transmitted by the receiving unit 104 for consumption at another location. In a multiple receiving unit scenario, each receiving unit 104 may determine and display (or transmit) the pressure information, including the DDP, of the individual space at which the receiving unit is sited.

The set point 402 of the receiving unit 104 may be the desired pressure in the space at which the receiving unit 104 is situated. For example, the system may use the DDP when the space transitions from an UNOCCUPIED state to an OCCUPIED state to set the set point via the receiving unit 104. In this context, "OCCUPIED" refers to a state in which the state of ventilation where the supply fan may be pressurizing the space or the exhaust may be depressurizing the space whereas "UNOCCUPIED" refers to a state in which the ventilation control system is quiescent and not impacting pressure within the space. After the system transitions to OCCUPIED (i.e., during the period of occupancy), the presentation of the DDP, presented for example via the visual display, may show whether the DDP is then above or below the differential pressure derived at the start of the OCCUPIED period (equivalently, at the end of the UNOCCUPIED period, such that the value reflects the final UNOCCUPIED state). If the differential pressure derived after the transition to OCCUPIED is above or below the differential pressure derived at the start of the OCCUPIED period, then measures may be taken to reduce the differential pressure, ideally (aspirationally) to zero or nearly so.

The absolute pressure of the space and the differential pressure relative to that space may be determined (measured and/or derived) on demand, intermittently, periodically, or continuously. Based on a set point established during the UNOCCUPIED time just prior to the OCCUPIED time, the presentation (e.g., visual display) may indicate when the (e.g., continuously) derived pressure is above 404 or below 406 the set point based on the absolute pressure values from both the transmitting unit 102 and receiving unit 104, modified by the applied offset term.

Figure 5:
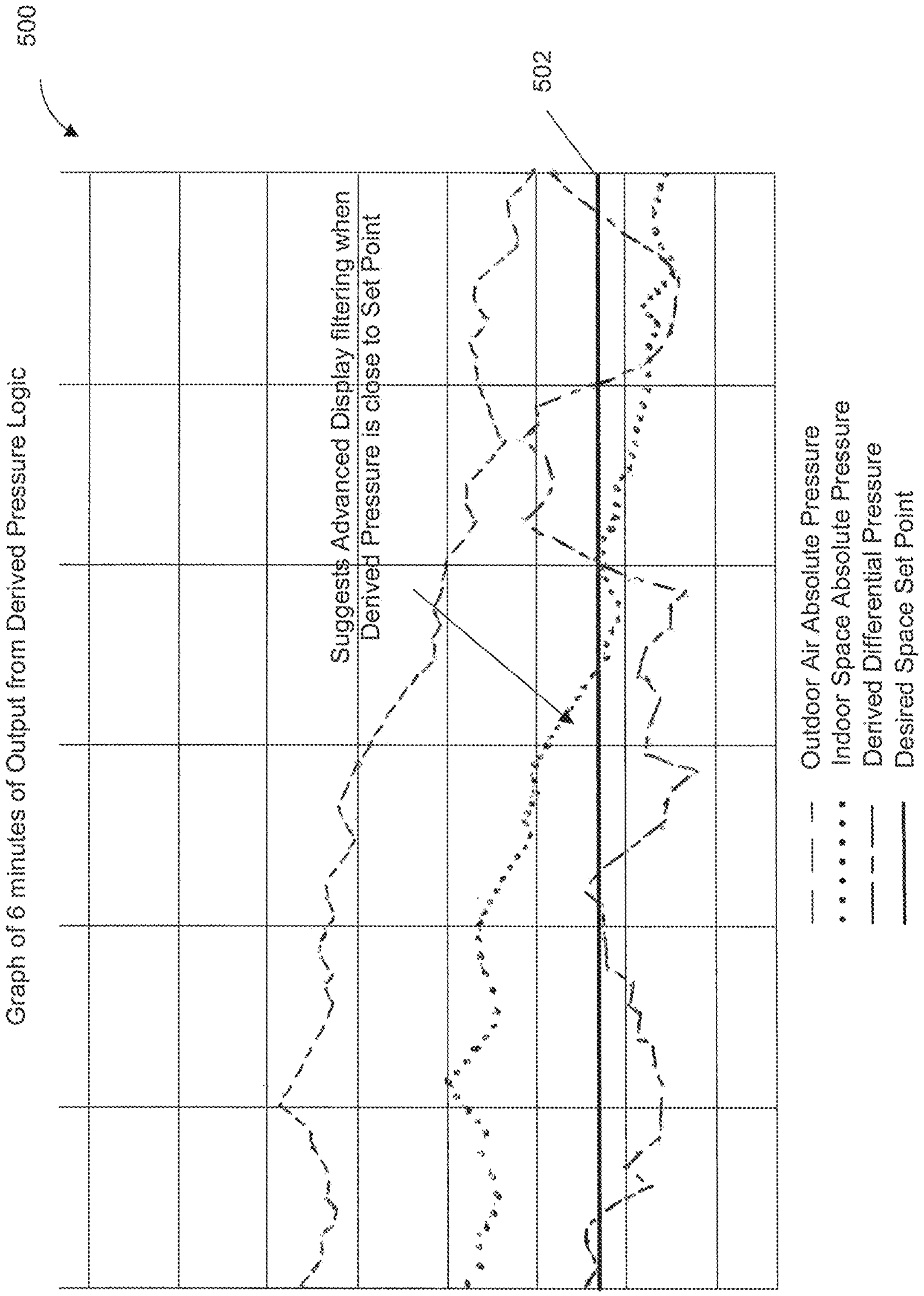
FIG. 5 illustrates an example of providing additional filtering to the derived differential pressure at the point of display.

FIG. 5 illustrates an example of providing additional filtering to the derived differential pressure at the point of display 500. In the illustrated example, there is a sensitivity of the differential pressure around the set point 502 determined with the absolute pressure detected by the absolute pressure sensor 336 at the beginning of the OCCUPIED cycle. In some examples, absolute pressure readings from the pressure sensors 204 and 336 may result in a DDP that oscillates about the set point 504 as illustrated, when the differential pressure is near the set point 502. In some embodiments, the visual display filter 320 may be applied prior to driving the output value for display to the user via the user interface 304 or separate display interface. For example, the display may be filtered by averaging differential pressure determinations over a set time period, such as where the number of terms in the filter is a function of the sample rate of the pressure sensor (data). The intent is to smooth or average the calculation over multiple data points. The averaging algorithm may take the sample period into consideration to maintain an accuracy in the resultant data. Applying this averaging to the output reduces oscillation that may appear in the data samples.

Figure 6:
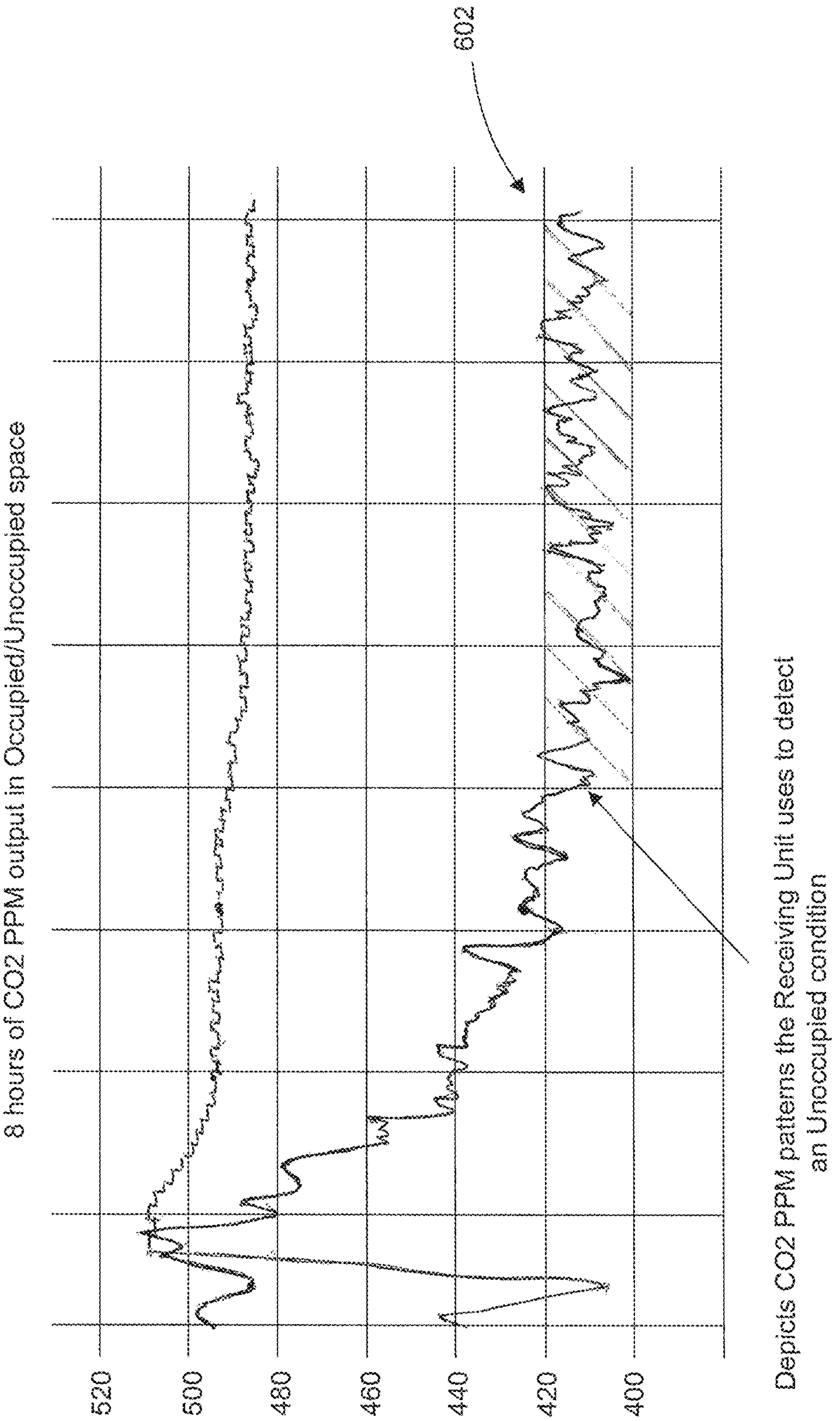
FIG. 6 illustrates the use of CO2 values (ppm) to determine UNOCCUPIED states and times, and to provide a zeroization trigger to begin the process of self-calibration by the ventilation control receiving unit.

FIG. 6 illustrates the use of CO2 values (ppm) to determine UNOCCUPIED states and times, and to provide a zeroization trigger to begin the process of self-calibration by the receiving unit 104, relative to a chart 600. Without limitation, the receiving unit 104 is capable of self-calibration during an UNOCCUPIED, quiescent time. The calibration method of zeroization can be triggered upon determining that the space is UNOCCUPIED.

The UNOCCUPIED state can be based on several factors, taken individually or in combination. For example, an UNOCCUPIED state may be determined on the basis of the CO2 level in the space, a schedule during which time periods are specified or expected to be UNOCCUPIED, observation of the space, and/or other measurables associated with the absence of people. CO2 and/or other levels may be derived directly from a stand-alone CO2 sensor, a CO2 sensor integrated with a thermostat, or received from a cloud or BMS system.

The trigger may be output in response to a reading by one or more of the other air quality sensors 334. For example, a CO2 parts per million value may be received from an on-board CO2 sensor (e.g., integral with the receiving unit 104) or a CO2 sensor coupled to the receiving unit 104. During times when the CO2 ppm indicates that the space is UNOCCUPIED, as at the shaded region 602, the receiving unit 104 may calibrate using the zeroization method, continuously, periodically, aperiodically, or on demand.

Figure 7:
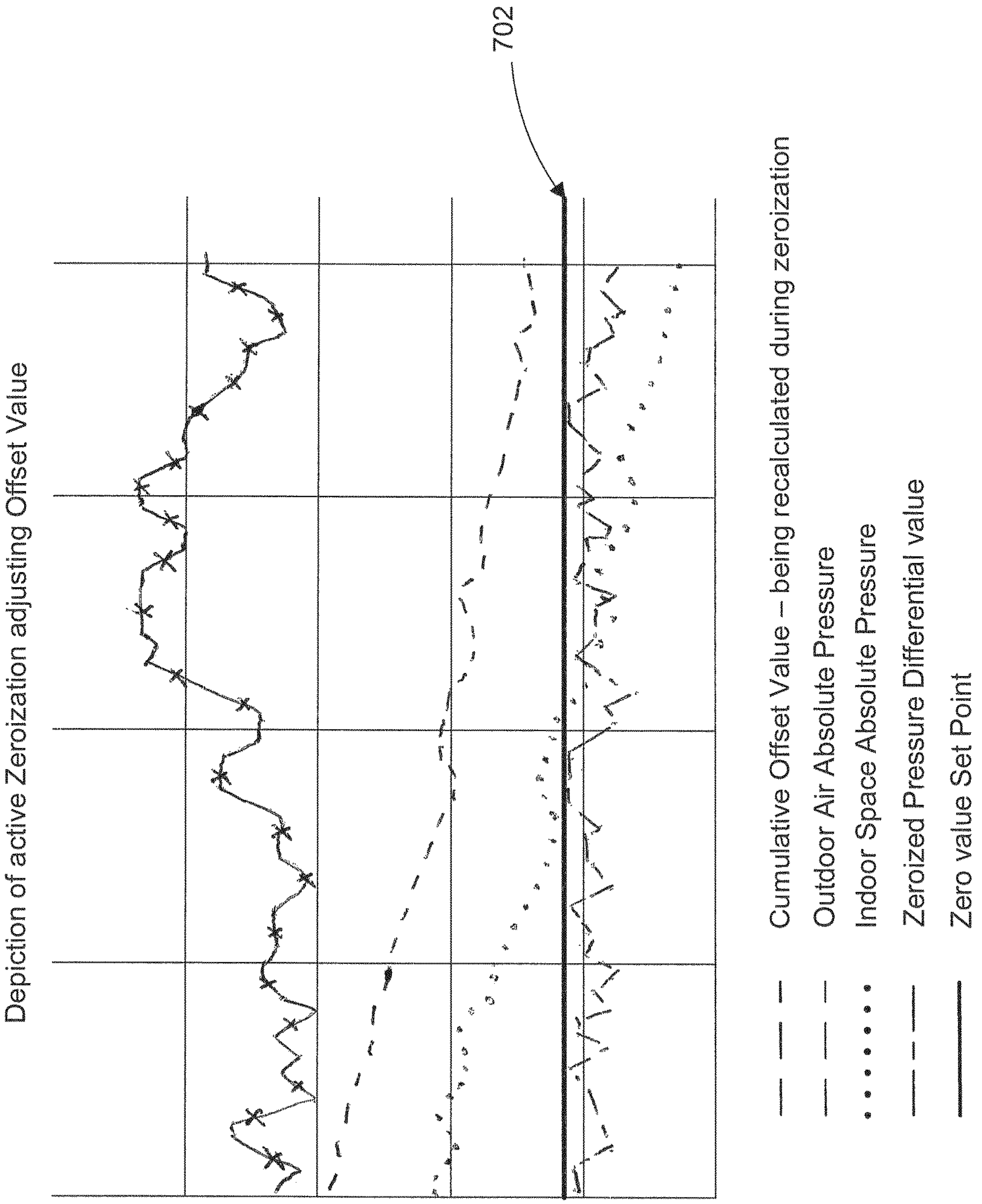
FIG. 7 illustrates an example of the zeroization method to calibrate between or among individual absolute pressure sensors such as the absolute pressure sensors 204 and 330 (individually for each receiving unit).

FIG. 7 illustrates an example of the zeroization method performed by the receiving unit(s) 104 to calibrate between or among individual absolute pressure sensors such as the absolute pressure sensors 204 and 330 (individually for each receiving unit). Zeroization cycles are trigged by the CO2 sensor, and/or BMS system during UNOCCUPIED state or at an UNOCCUPIED time when the supply and exhaust fans are quiescent. The zeroization method may account for production offsets in the individual sensors, altitude differences between the separated transmitting unit and receiving unit sensor(s), and/or drift over time that may occur in a sensor, resulting in a corresponding differential drift between the two differentiated sensors. To counter this, a zeroization may be performed by the receiving unit 104 when the UNOCCUPIED state of the space being monitored by the receiving unit 104 has been sensed, at some predetermined time set for the UNOCCUPIED state, or on demand.

In some embodiments, the zeroization algorithm 318 receives input of the air pressure values and a calculation is executed by the processor(s) 306 to determine one or more offset terms that bring the difference between the two air pressure values at that time to a zero value 702. This offset value(s) (collectively, offset term or offset value) may be based on various factors including, without limitation, production, altitude, and drift offset values, and may be determined in some embodiments according to a machine learning model 319 trained on empirical values. The offset values may be re-calculated during UNOCCUPIED times. In some embodiments, a rate of change filter may be applied to this derivation of this term. When the receiving unit 104 recognizes a transition into an OCCUPIED state by one of the triggers described herein, the last offset term may be used in the derived pressure calculation to account for production, altitude differences, and drift. During OCCUPIED times, the offset term may be fixed because environmental changes within the occupied space may be so frequent as to likely make calibration ineffective or at least inefficient.

The detection and adaptation of the algorithm to a crossover condition between, e.g., outdoor air pressure changes from positive to negative relative to the indoor air pressure. This condition can be seen when a low pressure weather event is in the vicinity of the building. The derived differential pressure calculation may be affected, causing the calculation to adjust for this pressure inversion between the independent sensors. This embodiment detects these relative pressure inversions and reflects this in the measurements set to the display or the building management system.

Figure 8:
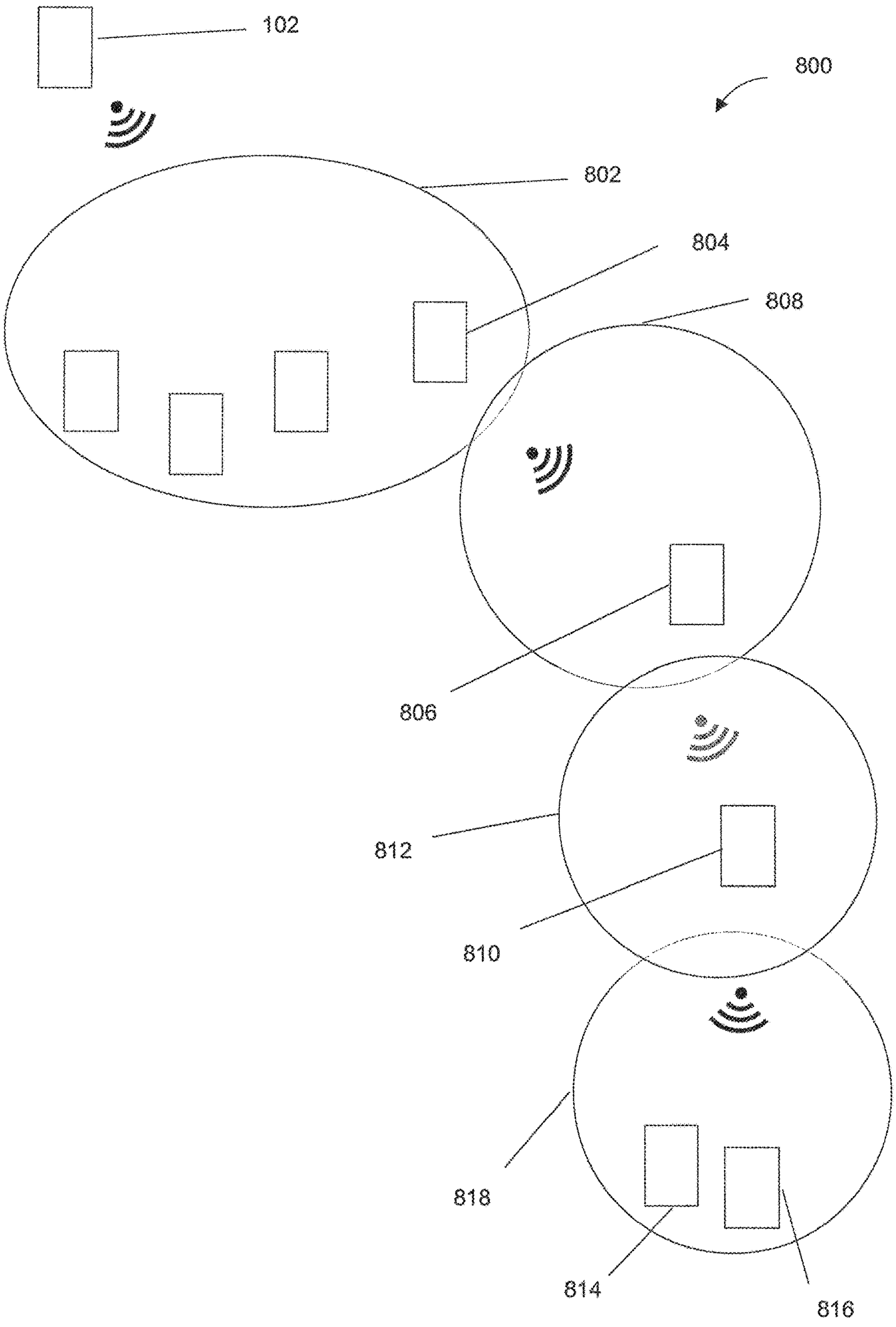
FIG. 8 depicts a communications configuration according to at least one embodiment.

FIG. 8 depicts a communications configuration 800 according to at least one embodiment. This is intended as an example of the type of communication architecture that can be addressed and is not intended to be the only architecture achievable.

In some embodiments, the pressure data measured at the transmitting unit 102 can form a baseline relative to which the differential pressure may be calculated. FIG. 8 depicts an example in which data from a transmitting unit, which may correspond to the transmitting unit 102, is transmitted and ultimately received by a plurality of receiving units 104. The number of receiving units is not limited to those shown in FIG. 8.

In some examples, the transmitting unit 102 may broadcast data over a Wi-Fi link (alternatively, the data may be addressed to specific receiving units). Receiving unit(s) 804 (which may corresponding to the receiving unit(s) 104) in area 802 within radio distance may capture the broadcast packets, and are configured onto the transmitting unit's micro access point. A receiving unit 806 in an area 808 may be configured to listen to one or more of the receiving units 804. In this example, the receiving unit 804 prepares a new transmission that includes the transmitting unit data along with relevant packet data like the air quality sensor information, temperature or dewpoint from the receiving unit 804. This new transmission of data is captured by the receiving unit 806 in area 808.

A receiving unit 810 in area 812 may be configured to listen to the receiving unit 806. The receiving unit 806 may prepare a new transmission that may include the transmitting unit data along with relevant packet data from the receiving unit 306. This new transmission of data is then captured by the receiving unit 814 or 816 in this example.

At the end of the chain, one or both of the receiving units 814 and 816 may be configured to listen to the receiving unit 810. The receiving unit 810 may prepare a new transmission that includes the transmitting unit data along with relevant packet data from the receiving unit 810. This new transmission of data is captured by the receiving units 814 and 816 in the area 818.

Figure 9:
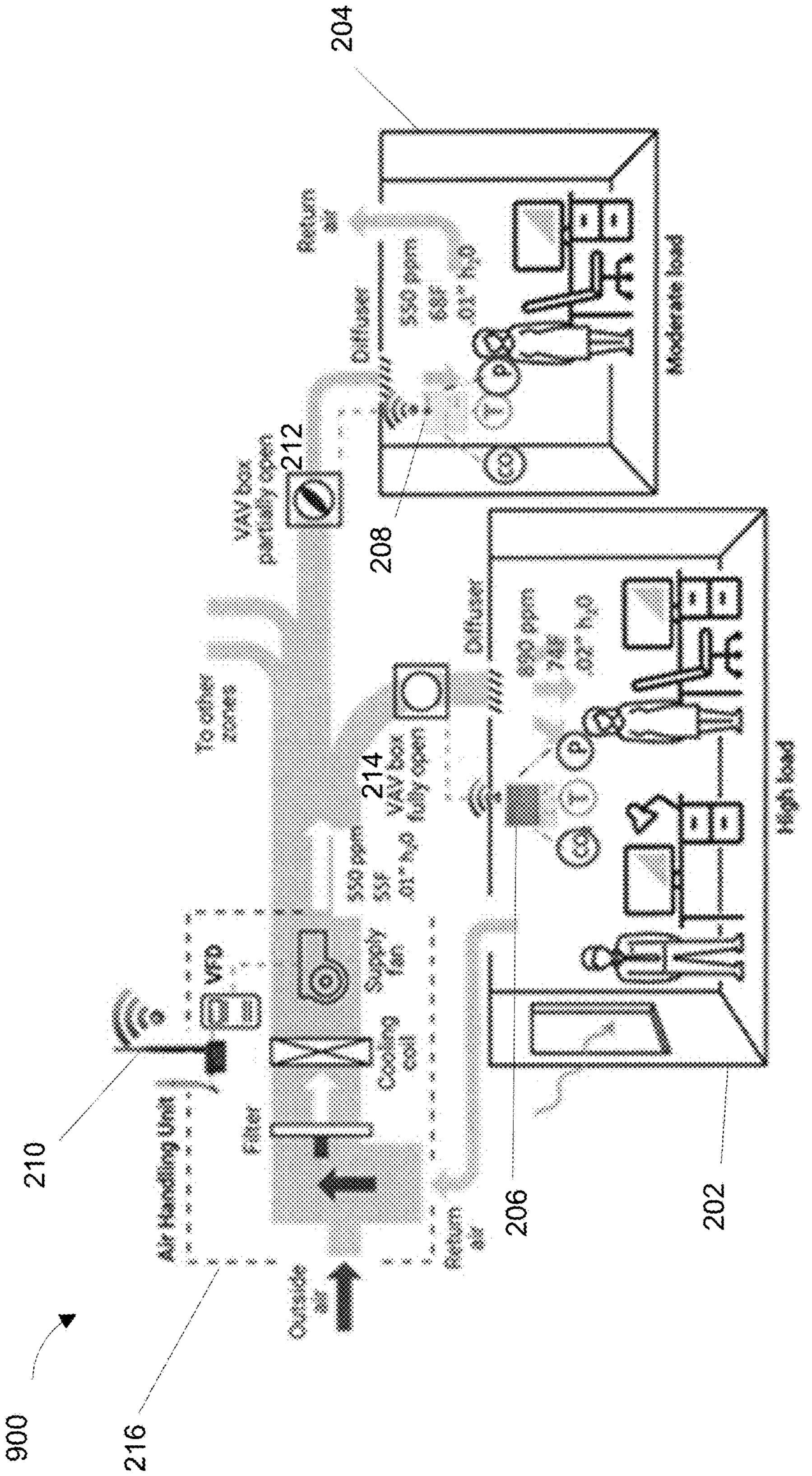
FIG. 9 depicts an embodiment configured to monitor and control a building's air handling system.

FIG. 9 depicts an embodiment configured to monitor and control a building's air handling system. FIG. 9 is intended as an illustration of a building air handling system 900 that can be controlled according to embodiments described herein and is not intended to be the only architecture achievable.

In FIG. 9, the receiving units 104 are shown installed into tenant spaces 902 and 904 as stand-alone units or embedded within standard thermostats 906 and 908, respectively, according to some embodiments. In one example, an outdoor transmitting unit 910 may continuously, periodically, aperiodically, or on demand broadcast outside air pressure measurements (absolute pressure) to the receiving units 104 over a Wi-Fi radio communications link. In this configuration, indoor air temperature, pressure, CO2, and/or airborne particles may be continuously measured or measured at intervals, or aperiodically or on demand, in each space by the receiving units 104 as described elsewhere herein. The in-space receiving units 104, e.g., in the thermostats 906 and 908, may be wired directly to the VAVs 912 and 914 to control the air flow being delivered to each space based on the measured temperature, CO2, particle, and/or pressure parameters. Temperature may be maintained by the control algorithm described above to allow cooler or warmer air into the space to move the temperature toward temperature set points programmed into the receiving units 104. The VAV 912 or 914 serving a particular space is controlled based on an established pressure set range that is configured into the unit as the set points described above. On-demand ventilation may also be controlled based on the CO2 parts per million count in the room, for example. The VAV control algorithm is prioritized to maintain temperature set points within the space. Another consideration in the VAV control algorithm is pressure within the space being within a specified range, such as the a specific space pressure of 0.01-0.05 inches of water. All parameters work over ranges with the control algorithm optimized to maintain the range defined by these three parameters.

The disclosed ventilation air input and exhaust controls take into consideration occupancy. When 100% occupied they bring in a maximum ventilation. When occupied at ½ the rating, they close down the from the max open position. In some embodiments, this new air may be reconditioned (heated or cooled), so there are energy costs. In this illustration, a high load ppm and lower temperature may cause the VAV to be fully open, for example, allowing increased air flow from the air handling unit 916. Alternatively, in a space with half of the occupants the ventilation was designed for, the VAV may be partially open. Based on the DDP, the exhaust air will be controlled to maintained the set point during the introduction of new air into the space.

In this illustration, a receiving unit mounted in the air handling unit may receive control commands from one or more of the receiving units to control a variable drive on the supply fan to control the rate/pressure of the air being introduced into the ducting system, for the building as a whole, individual spaces monitored by respective receiving units, and/or specific to the site at which and individual receiving unit is mounted, in various embodiments. For example, the pressure, ppm and temperature from the individual spaces may be transmitted to the receiving unit mounted in the Air Handling Unit. Parameters such as absolute air pressure and temperature from the spaces may be included in supply and/or exhaust fan control algorithms. The supply fan rate is controlled based on air quality measurements and the deviation above or below temperature set point from the individual spaces this Air Handling unit is serving. In the Air Handler-based receiving unit, additional wired temperature sensors may be attached to directly monitor the temperature of air supplied to the ducting system and also to monitor the temperature on the evaporator coils for freeze detection. Diagnostics embedded in the receiving unit may take appropriate action when icing on the coils is detected by scaling the fan to 100% or other measure. Control of the exhaust fan in the Air Handler is based on set points established for the individual spaces. Control of the pressure within the individual space may be controlled by that space's VAV.

Figure 10:
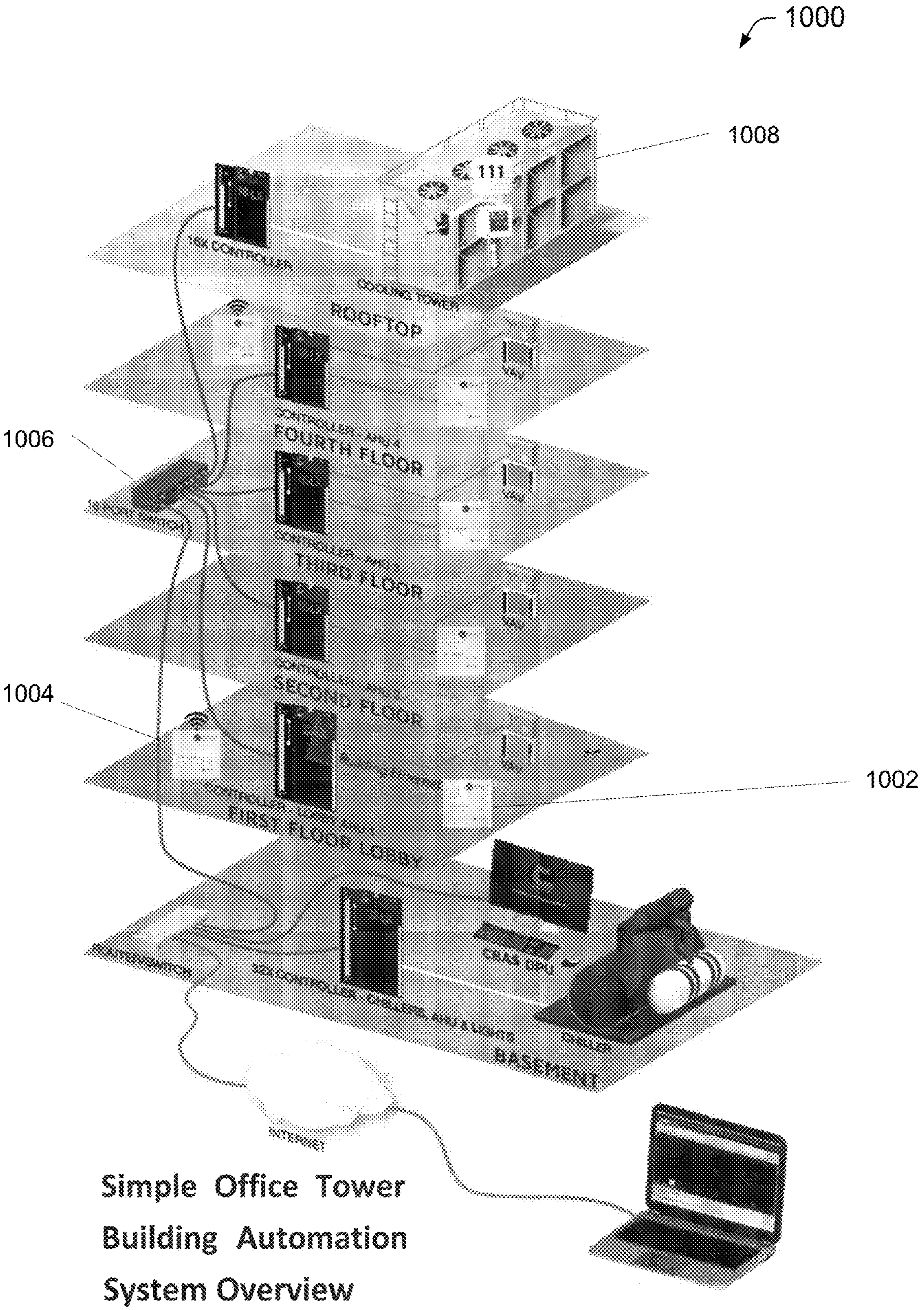
FIG. 10 depicts a communications configuration configured to a building wide building management system (BMS) over a BacNet, Ethernet, or other switched communications architecture within the building.

FIG. 10 depicts a communications configuration 1000 configured to a building wide building management system (BMS) over a BacNet, Ethernet, or other switched communications architecture within the building. This is intended as an example of a type of communication architecture and is not intended to be the only architecture achievable.

This illustration depicts the individual floor receiving units 1002 and 1004 that can be installed throughout the building. In this illustration, the receiving units 1002 and 1004 may be wired directly to the building communications infrastructure switch 1006 and wireless to a gateway or router that translates the information to the building BMS. A transmitting unit 1008, depicted outside the building on the roof, may continuously measure outside air conditions including but not limited to air pressure, particulates, temperature, humidity, and other gases. This information may be transmitted to receiving units in the building and used by the receiving units to calculate relative differential pressures at the building site.

In some embodiments described herein, the "stack effect" in tall buildings can be eliminated through the zeroization algorithm used by each of the individual receiving units. To this end, the receiving units can calculate differential pressures from other receiving units as well as outside air, and use these peer-to-peer measurements for determined air flow within the building consistent with embodiments described herein. For example, consistent with the algorithms described herein, instead of differential pressures being determined relative to outside air, the differential pressure may be determined between two different rooms on a single floor. This will indicate which way the air is flowing—from higher to lower pressure.

Thus, Peer-to-Peer measurements can be made between two different rooms on a single floor. This data is an indicator to the BMS system which way the air is flowing—from the higher pressure zone to the lower pressure zone. This is of particular use to a building with VAVs in the primary spaces but not in ancillary rooms. The pressure differential provides information about the air movement between these two spaces. In most buildings, with one exception being laboratory spaces, it can be advantageous (e.g., for energy savings) to keep spaces slightly positively pressurized usually between 0.01 and 0.05 inches of water.

Data from the building wide receiving units may be continuously sent to the building communications system and received by the BMS controller in the building or remote from the building. Based on the temperature, ppm, pressure and other air quality readings, the BMS system can be programmed with a specific algorithm to control VAVs in the building. The BMS programming then sends signals over the communications system to specific VAVs to control them based on individual space information provided by the receiving units.

Figure 11:
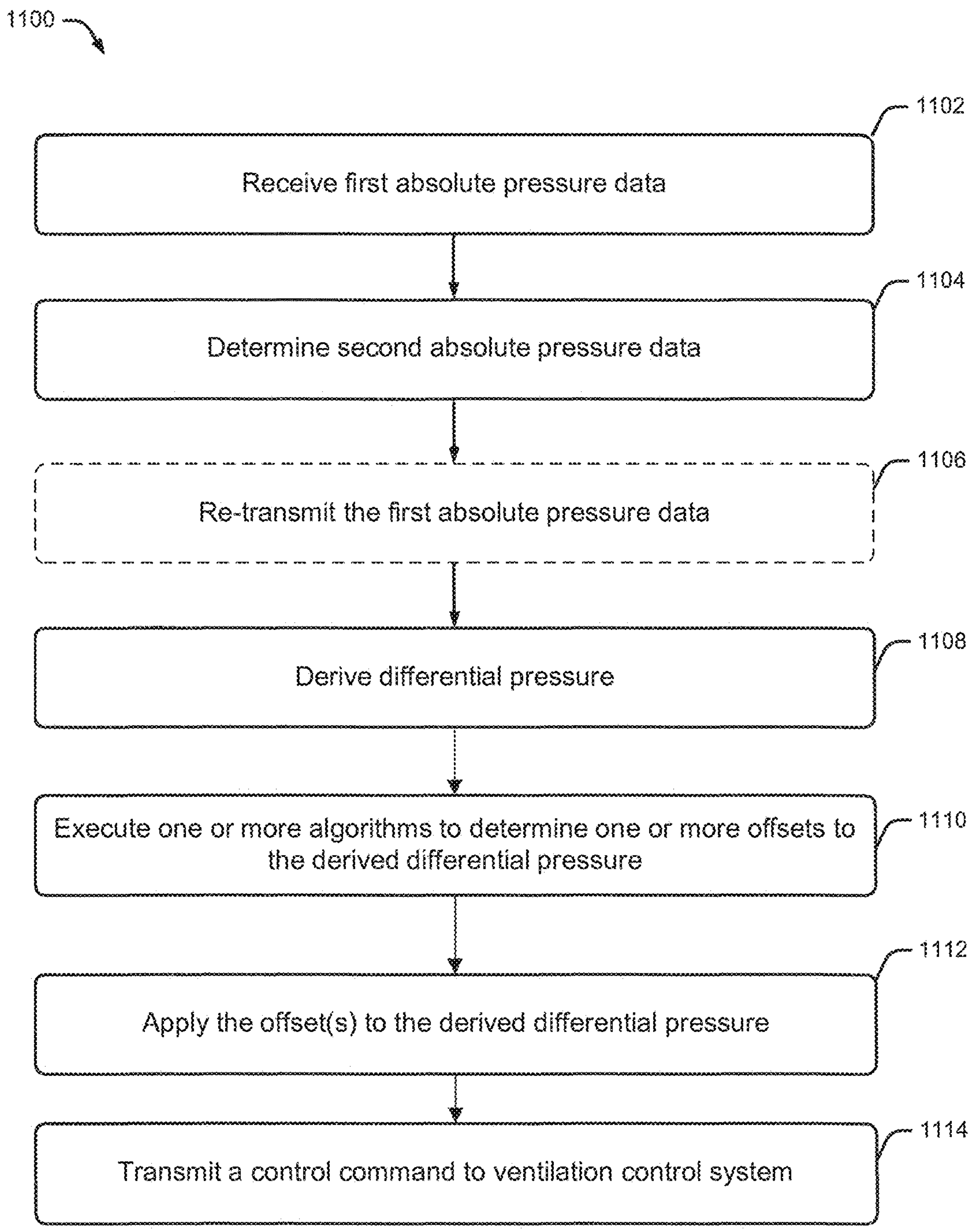
FIG. 11 depicts a process for controlling a ventilation system according to at least one embodiment.

FIG. 11 depicts a process 1100 for controlling a ventilation system according to at least one embodiment.

At block 1102, a receiving unit, such as the receiving unit 104 located in an indoor space, may receive first absolute pressure data. In some embodiments, the first absolute pressure data may be received from a transmitting unit, such as the transmitting unit 102 located in an outdoor environment, and represent air pressure measured by a sensor on the transmitting unit or by a sensor in the same general vicinity as the transmitting unit.

At block 1104, the receiving unit may determine second absolute pressure data, which may represent the air pressure measured at or near the space at which the receiving unit is situated. The second absolute pressure may be sensed by an air pressure sensor housed in the receiving unit, which itself may be housed in a thermostat or in a stand-alone unit.

At block 1106, the receiving unit may re-transmit the first absolute pressure data to one or more other receiving units that, e.g., are unable to receive the first absolute pressure data directly from the transmitting unit. Block 1106 is shown in dashed lines to indicate that re-transmission may not be necessary in every implementation, such as when all receiving units are capable of receiving direct transmissions from the transmitting unit or when the receiving unit is not configured for re-transmission.

At block 1108, the receiving unit may derive a differential pressure between the first and second absolute pressures. The derived differential pressure may form the basis for controlling a variety of HVAC, BMS, or other ventilation control systems to maintain or set air pressure and/or air quality conditions at least in the space at which the receiving unit is positioned.

At block 1110, the receiving unit may execute one or more algorithms to determine one or more offsets to the derived differential pressure. The offsets are intended to calibrate for variances resulting from the likes of manufacturing/production of devices (e.g., pressure, CO2 and other air quality sensors), drift, and altitude. One goal of the offsets is to bring the derived differential pressure to a set point such that the difference in measured pressures, typically referenced to outside air but could be to another indoor space, complies with guidelines or preferences.

At block 1112, the receiving unit may apply the offset(s) to the derived differential pressure. An installer, inspector, or other operator or user may, in some instances, view the derived differential pressure, absolute pressures, and set point via a display to monitor or adjust settings as needed.

At block 1114, the receiving unit may transmit a control command or commands to one or more ventilation control systems (e.g., HVAC or BMS). Among other adjustments that can be made according to the control commands are modulating a VAV, adjusting temperature, and/or adjusting humidity of the space.

Figure 12:
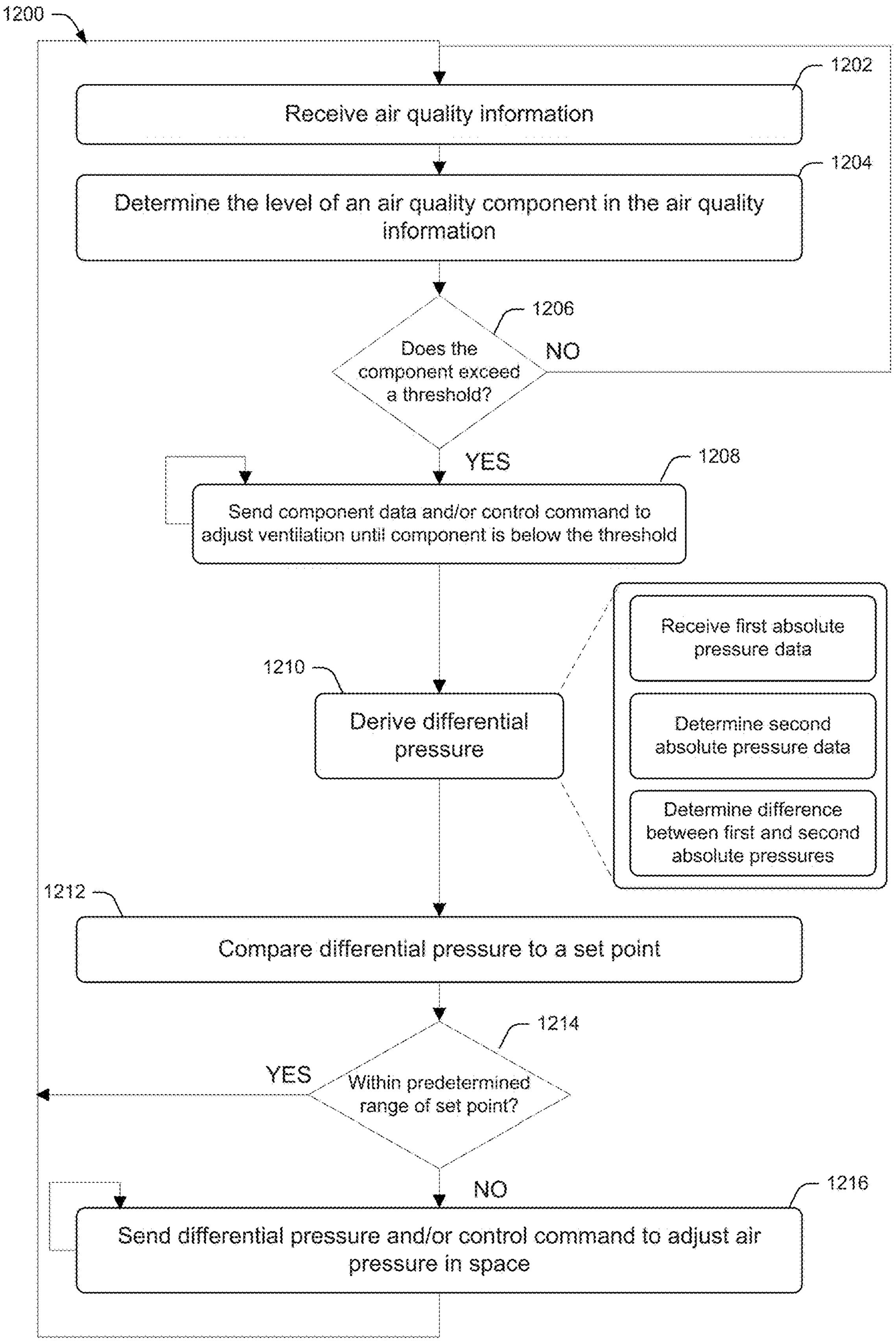
FIG. 12 depicts a process 1200 for controlling a ventilation system according to at least one embodiment.

FIG. 12 depicts a process 1200 for controlling a ventilation system according to at least one embodiment.

At block 1202, a receiving unit, such as the receiving unit 104 located in an indoor space, may receive air quality information. The air quality information may include data relating to any of various quantifiable air quality components, which may include CO2 parts per million, rapid changes to Volatile Organic Gase index or the recognition of a large density of particulates that may be in the pathogen range. In some embodiments, the air quality information may be received from one or more embedded sensors such as the sensors 330, 332, and/or 334, or separately positioned sensors. For example, the receiving unit 104 may receive temperature data via its own integrated temperature sensor. In another embodiment, the receiving unit 104 may be positioned separately from a temperature sensor that provides it with the temperature data, for example the temperature sensor of a thermostat. For example, the receiving unit 104 may be integrated with the thermostat from which it receives the temperature data, or not integrated with the thermostat and receive the temperature data from the thermostat or from a separate temperature sensor with which the receiving unit is in communication. The receiving unit 104 may receive other air quality data as described herein from corresponding sensors in a similar manner (i.e., from embedded or remote sensors, including sensors of integrated devices).

At block 1204, the receiving unit may determine the level of an air quality parameter in the space from the air quality information received from an embedded or remote sensor. For example, the receiving unit may determine the temperature in the space from temperature data received from an embedded or remote temperature sensor.

At block 1206, the receiving unit may determine whether the air quality parameter, such as the temperature, in the space determined at the block 1204 exceeds a predetermined threshold. For example, one or more processors, such as the processor(s) 306, may execute the AQ control algorithm 322 to compare the air quality parameter to a stored threshold.

Based on a determination that the air quality component exceeds the threshold (i.e., YES at block 1206), at block 1208, the receiving unit may send component level(s) and/or a control command to the ventilation system (e.g., to a controller (e.g., control unit) in the HVAC system or BMS) to adjust the ventilation appropriately until the component no longer exceeds the threshold. For example, the one or more processors may execute the AQ algorithm 322 and transmit the component data to the control unit via a wireless or wired connection. In some embodiments, the receiving unit may send a control command to open a damper that introduces fresh air into the ducting system, resulting in an increase in the pressure in the building. Whether responding to the component data or a control command, during this time, the control unit may modulate the damper to adjust based on the air quality information or control command, an objective being to lower any of the excessive air quality parameters until they are in the health zone.

Based on a determination that the air quality component does not exceed the threshold (i.e., NO at block 1206), the process 1200 may return to block 1202.

At block 1210, the receiving unit may use data from the transmitting unit (e.g., the transmitting unit 102) to derive the DDP as described elsewhere herein. For example, the DDP may be derived as described with respect to FIG. 11 (i.e., receive the first absolute pressure data from the transmitting unit, determine the second absolute pressure, and determine the difference between the two).

At block 1212, based on the derived DDP, the receiving unit may compare the DDP to against the predetermined pressure set point.

At block 1214, the receiving unit may determine whether the DDP is within a predetermined range of the predetermined set point.

Based on a determination that the DDP is not within the predetermined set range (i.e., NO at block 1214), the process 1200 may proceed to block 1216, where the receiving unit may (e.g., continuously) derive and compare the DDP against the set point and send to the control unit the DDP and/or control commands to adjust the ventilation as needed to bring the DDP into line. In the example described here, as new air is being introduced due to the adjustment(s) being implemented in response to the air quality measurements, the DDP will be subject to change. During this time, the control unit, based on Proportional and Integrated techniques, which may include some used by the industry, an exhaust fan or fans can be adjusted to maintain the pressure within range of the set point, an objective being to exhaust the new air being introduced by opening the input air damper, for example.

Although a few implementations have been described in detail above, other modifications are possible. In addition, the logic flows and processes depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A ventilation control receiving unit, comprising:
one or more processors; and
memory storing computer-readable instructions that, if executed by the one or more processors, cause the one or more processors to perform operations comprising:
receiving a first absolute pressure;
via an absolute pressure sensor, determining a second absolute pressure in a space;
deriving a differential pressure (DDP) in the space based on an absolute pressure difference between the second absolute pressure and the first absolute pressure;
receiving output from an air quality sensor in the space;
determining an unoccupied status of the space based on the received air quality sensor output;
triggering, in response to determining the unoccupied status of the space, beginning of a self-calibration performed during the unoccupied status, the self-calibration including an iterative zeroization process that includes repeatedly:
via the absolute pressure sensor, determining a new absolute pressure in the space;
deriving a new DDP in the space based on the new absolute pressure;
determining an offset value based on the new DDP; and
modifying the new DDP by the offset value until the modified DDP is within a preset tolerance of a set point;
detecting that the occupancy status has transitioned from unoccupied to occupied;
triggered by detecting the occupancy status transition, ending the self-calibration, wherein the offset value at the end of the self-calibration is a final offset value modifying the new DDP;
fixing the final offset value as the offset value for the duration of the occupied status; and
transmitting a control command to a ventilation control system based on applying the final offset value to the DDP calculated during the occupied status.

2. The ventilation control receiving unit of claim 1, further comprising:
via the air quality sensor, determining an air quality factor in the space based on a combination of dewpoint, volatile organic gases, and small particles;
wherein the control command controls increasing fresh or new air into the space and/or decreasing used or stale air from the space based on the air quality factor of the space.

3. The ventilation control receiving unit of claim 1, further comprising:
a power management module, wherein the operations further comprise:
waking up the receiving unit according to a power plan established for the power management module; and
configuring the receiving unit to receive the air quality sensor output based on waking up.

4. The ventilation control receiving unit of claim 1, wherein the operations further comprise:
triggering the transmitting in response to the occupancy status transitioning from unoccupied to occupied.

5. The ventilation control receiving unit of claim 1, wherein the iterative zeroization process is triggered by receiving a signal from a BMS system running an algorithm determining the set point based on the DDP being input as an independent variable.

6. The ventilation control receiving unit of claim 1, wherein the air quality sensor is a CO2 sensor, and the occupancy the unoccupied status is based on a level of CO2 in the space measured by the CO2 sensor.

7. The ventilation control receiving unit of claim 1, further comprising:
the absolute pressure sensor, which is a CO2 sensor;
the air quality sensor;
a power management module; and
a zeroization module,
wherein the operations further comprise:
via the air quality sensor, determining an air quality factor in the space, wherein the control command controls increasing fresh or new air into the space and/or decreasing used or stale air from the space based on the air quality factor in the space; and
waking up the receiving unit according to a power plan established for the power management module, and configuring the receiving unit to receive the air quality sensor output based on waking up;
wherein the iterative zeroization process is triggered by receiving a signal from a BMS system running an algorithm determining the set point based on the DDP being input as an independent variable; and
wherein the unoccupied status is based on a level of CO2 in the space measured by the CO2 sensor.

8. A ventilation control system, comprising:
a ventilation system controller; and
a first ventilation control receiving unit that comprises:
one or more processors; and
memory storing computer-readable instructions that, if executed by the one or more processors, cause the one or more processors to perform operations comprising:
receiving air quality information about air in a first indoor space inside a building managed by a building management system (BMS), wherein the first indoor space is at a first indoor absolute pressure;
determining a level of an air quality component in the air quality information;
determining that the level of the air quality component exceeds a threshold;
based on determining that the level of the air quality component exceeds the threshold, transmitting the level and/or a control command to the ventilation system controller, to introduce fresh air into the building until the level of the air quality component is below the threshold, wherein introducing the fresh air causes the pressure in the first indoor space to change to a second indoor absolute pressure;
receiving a first absolute pressure;
via an absolute pressure sensor, determining the second indoor absolute pressure in the first indoor space;
deriving a differential pressure (DDP) in the first indoor space based on an absolute pressure difference between the second indoor absolute pressure and the first absolute pressure;

comparing the DDP to a set point;

determining that the DDP is not within a predetermined range of the set point; and based on determining that the DDP is not within the predetermined range, transmitting the DDP and/or a control command to the ventilation system controller to change the volume of fresh air being introduced into the building so as to revert the second indoor air pressure and bring the DDP to within the predetermined range of the set point.

9. The system of claim 8, wherein the first ventilation control receiving unit further comprises:

an occupancy sensor, wherein the operations further comprise:

via the occupancy sensor, determining occupancy status of the first indoor space; and triggering the determining of the level of the air quality component in response to the occupancy status changing from unoccupied to occupied.

10. The system of claim 9, wherein the first ventilation control receiving unit further comprises:

a zeroization module, wherein the operations further comprise:

determining that the occupancy status of the first indoor space is unoccupied;

calculating an offset value; and triggering an iterative zeroization to the set point in response to determining that the occupancy status is unoccupied, including applying iteratively the offset value until the DDP is within a preset tolerance of the set point.

11. The system of claim 10, wherein the operations further comprise:

continuously calculating the offset value during the unoccupied status until the occupancy status transitions from unoccupied to occupied;

triggering an end to the continuous calculating of the offset value; and applying the final offset value to the DDP corresponding to the transition from unoccupied to occupied.

12. The system of claim 9, wherein the first ventilation control receiving unit further comprises:

a zeroization module, wherein the operations further comprise:

determining that the occupancy status of the first indoor space is unoccupied;

calculating an offset value; and triggering an iterative zeroization to the set point in response to receiving a signal from a BMS system running an algorithm determining the set point based on the DDP input as an independent variable, including applying iteratively the offset value until the DDP is within a preset tolerance of the set point.

13. The system of claim 8, wherein the first ventilation control receiving unit further comprises:

a CO2 sensor, wherein the operations further comprise:

via the CO2 sensor, determining occupancy status of the first indoor space based on the level of CO2 in the first indoor space measured by the CO2 sensor; and triggering the determining of the air quality component in response to the occupancy status transitioning from unoccupied to occupied.

14. The system of claim 8, further comprising:

a plurality of ventilation control receiving units that include the first ventilation control receiving unit and a second ventilation control receiving unit, wherein the second ventilation control receiving unit is in a second indoor space different from the first indoor space at a third indoor absolute pressure:

the first absolute pressure is received by the first ventilation control receiving unit from an outdoor transmitting unit;

the first ventilation control receiving unit is configured to re-transmit the first absolute pressure received from the outdoor transmitting unit; and the second ventilation control receiving unit is configured to receive the first absolute pressure from the first ventilation control receiving unit and to perform the operations with respect to the second indoor space.

15. A computer-implemented method, comprising:

receiving, from a transmitting unit, a first absolute pressure;

determining, by an absolute pressure sensor, a second absolute pressure in a space;

deriving a differential pressure (DDP) in the space based on an absolute pressure difference between the second absolute pressure and the first absolute pressure;

receiving output from an air quality sensor in the space;

determining an unoccupied status of the space based on the received air quality sensor output;

triggering, in response to determining the unoccupied status of the space, beginning of a self-calibration performed during the unoccupied status, the self-calibration including a zeroization process that includes iteratively:

via the absolute pressure sensor, determining a new absolute pressure in the space;

deriving a new DDP in the space based on the new absolute pressure;

determining an offset value based on the new DDP; and modifying the new DDP by the offset value until the modified DDP is within a preset tolerance of a set point;

detecting that the occupancy status has transitioned from unoccupied to occupied;

triggered by detecting the occupancy status transition, ending the self-calibration, wherein the offset value at the end of the self-calibration is a final offset value modifying the new DDP;

fixing the final offset value as the offset value for the duration of the occupied status; and transmitting a control command to a ventilation control system based on applying the final offset value to the DDP calculated during the occupied status.

16. The computer-implemented method of claim 15, further comprising:

triggering the transmitting in response to the occupancy status transitioning from unoccupied to occupied.

17. The computer-implemented method of claim 16, further comprising:

continuously calculating the offset value during the unoccupied status until the occupancy status transitions from unoccupied to occupied.

18. The computer-implemented method of claim 15, wherein the zeroization process is triggered by receiving a signal from a BMS system running an algorithm determining the set point based on the DDP being input as an independent variable.

19. The computer-implemented method of claim 15, further comprising:

determining the occupancy status based on a level of CO2 in the space.

20. The method of claim 15, further comprising:

determining a level of an air quality component in the air quality sensor output;

determining whether the level of the air quality component exceeds a threshold; and based on determining that the level of the air quality component exceeds the threshold, transmitting the air quality level and/or a control command to the ventilation system controller.

* * * * *